United States Patent
Reed et al.

(10) Patent No.: US 9,409,561 B2
(45) Date of Patent: Aug. 9, 2016

(54) COORDINATED ENGINE START IN HYBRID VEHICLE

(71) Applicant: FORD GLOBAL TECHNOLOGIES, LLC, Dearborn, MI (US)

(72) Inventors: Dennis Craig Reed, Dexter, MI (US); Jeffrey Allen Doering, Canton, MI (US); David Oshinsky, Trenton, MI (US); Xiaoyong Wang, Novi, MI (US); Felix Nedorezov, Rochester Hills, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/257,251

(22) Filed: Apr. 21, 2014

(65) Prior Publication Data
US 2015/0298677 A1 Oct. 22, 2015

(51) Int. Cl.
*B60W 10/06* (2006.01)
*B60W 10/08* (2006.01)
*B60W 20/00* (2016.01)

(52) U.S. Cl.
CPC .............. *B60W 10/06* (2013.01); *B60W 10/08* (2013.01); *B60W 2710/06* (2013.01); *B60W 2710/08* (2013.01); *Y10S 903/902* (2013.01)

(58) Field of Classification Search
CPC ..... B60W 10/08; B60W 10/06; B60W 20/00; F02N 2300/104
See application file for complete search history.

(56) References Cited

U.S. PATENT DOCUMENTS

| | | | |
|---|---|---|---|
| 7,273,119 B2 | 9/2007 | Tsuneyoshi et al. | |
| 7,370,715 B2 | 5/2008 | Colvin et al. | |
| 7,896,114 B2 | 3/2011 | Colvin et al. | |
| 8,142,328 B2 | 3/2012 | Reuschel | |
| 2004/0153234 A1* | 8/2004 | Mogi ..................... | B60K 6/445 701/103 |
| 2006/0048734 A1* | 3/2006 | Kataoka ................. | B60K 6/485 123/179.4 |
| 2010/0251984 A1* | 10/2010 | Bouchon ............... | B60W 10/06 123/179.3 |
| 2013/0074809 A1* | 3/2013 | Nakamoto .............. | F02N 19/00 123/478 |
| 2013/0233268 A1* | 9/2013 | Yamaguchi ............. | F02D 29/02 123/179.3 |
| 2014/0324263 A1* | 10/2014 | Tabata ................... | B60K 6/442 701/22 |
| 2015/0142235 A1* | 5/2015 | Miwa .................... | B60K 6/445 701/22 |

FOREIGN PATENT DOCUMENTS

| | | | | |
|---|---|---|---|---|
| FR | 2805571 A1 | * | 8/2001 | ............. F02N 11/04 |
| WO | WO2013175555 A1 | * | 11/2013 | ............ B60W 20/00 |

* cited by examiner

*Primary Examiner* — Tisha Lewis
(74) *Attorney, Agent, or Firm* — David B. Kelley; Brooks Kushman P.C.

(57) ABSTRACT

A method for controlling a hybrid vehicle powertrain, where the powertrain includes a motor and an engine, includes providing a first motor torque in response to an engine start request. The first motor torque cranks the engine through a first compression event. The method additionally includes providing a second motor torque in response to the engine being cranked through the first compression event. The second motor torque is less than the first motor torque.

13 Claims, 4 Drawing Sheets

COORDINATED ENGINE START IN HYBRID VEHICLE

TECHNICAL FIELD

The present disclosure relates to hybrid vehicles and to methods of controlling engine starts in such vehicles.

BACKGROUND

Hybrid electric vehicles (HEVs) utilize a combination of an internal combustion engine with at least one electric motor to provide power to vehicle traction wheels. HEVs may be configured to shut down the engine under certain operating conditions and operate in an electric only mode. In such situations, the electric motor provides all of the power to propel the vehicle. The engine may subsequently be started in response to, for example, an increase in drive power demand or a decrease in battery state of charge.

SUMMARY

A method for controlling a hybrid vehicle powertrain, where the powertrain includes a motor and an engine, includes providing a first motor torque in response to an engine start request. The first motor torque cranks the engine through a first compression event. The method additionally includes providing a second motor torque in response to the engine being cranked through the first compression event. The second motor torque is less than the first motor torque and cranks the engine through subsequent compression events.

In one embodiment, the engine start request is a first start request subsequent to a key-on event. In such an embodiment, the first motor torque is based on a calibratable baseline torque and at least one engine operating condition including temperature, pressure, an engine friction estimate, and an elapsed time with the engine off. In another embodiment, the engine start request is at least a second start request subsequent to a key-on event. In such an embodiment, the first motor torque is based on a calibratable baseline torque and at least one engine operating condition including an engine stop position, temperature, pressure, an engine friction estimate, and an elapsed time with the engine off. In additional embodiments, the second motor torque is based on a calibratable baseline torque at least one engine operating condition including temperature, pressure, an engine friction estimate, and an elapsed time with the engine off. In some embodiments, the first motor torque is recalculated after a calibratable interval elapses.

In some embodiments, the method further includes providing a motor drive torque to vehicle traction wheels in response to a driver torque request. In such an embodiment, providing a first motor torque comprises commanding the motor to provide the first motor torque and the motor drive torque. Similarly, providing a second motor torque comprises commanding the motor to provide the second motor torque and the second drive torque.

A hybrid vehicle according to the present disclosure includes an internal combustion engine, a motor configured to provide drive torque to vehicle wheels and cranking torque to the engine, and at least one controller. The controller is configured to command the motor to provide a first torque to crank the engine through a first compression event in response to an engine start request. The controller is additionally configured to command the motor to provide a second torque in response to the engine being cranked through the first compression event, where the second torque is less than the first torque.

In one embodiment, the engine start request is a first start request subsequent to a key-on event. In such an embodiment, the first torque is based on a calibratable baseline torque and at least one engine operating condition including temperature, pressure, an engine friction estimate, and an elapsed time with the engine off. In another embodiment, the engine start request is at least a second start request subsequent to a key-on event. In such an embodiment, the first torque is based on a calibratable baseline torque and at least one engine operating condition including an engine stop position, temperature, pressure, an engine friction estimate, and an elapsed time with the engine off. In additional embodiments, the second torque is based on a calibratable baseline torque at least one engine operating condition including temperature, pressure, an engine friction estimate, and an elapsed time with the engine off. In some embodiments, the controller is further configured to intermittently recalculate the first torque and second torque at calibratable intervals.

A method for controlling a motor in a hybrid vehicle according to the present disclosure includes providing drive torque to vehicle traction wheels when an engine is stopped. The method additionally includes providing a first additional torque to crank the engine through a first compression event in response to an engine start request. The method further includes providing a second additional torque in response to the engine being cranked through the first compression event. The second additional torque is less than the first additional torque.

In one embodiment, the first additional torque is calculated based on at least one of: a calibratable baseline torque, an engine stop position, temperature, pressure, an engine friction estimate, and an elapsed time with the engine off. In such an embodiment, the method may further include recalculating the first additional torque at calibratable intervals. In another embodiment, the second additional torque is calculated based on at least one of: a calibratable baseline torque, temperature, pressure, an engine friction estimate, and an elapsed time with the engine off. In such an embodiment, the method may further include recalculating the second additional torque at calibratable intervals.

Embodiments according to the present disclosure provide a number of advantages. For example, the present disclosure provides a system and method for starting an engine in a hybrid vehicle using lower motor torque than known methods, resulting in increased efficiency. This may result in an increased efficiency engine start. In addition, the present disclosure provides a system and method for using a motor/generator to efficiently start an engine without disturbing torque provided to vehicle traction wheels.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
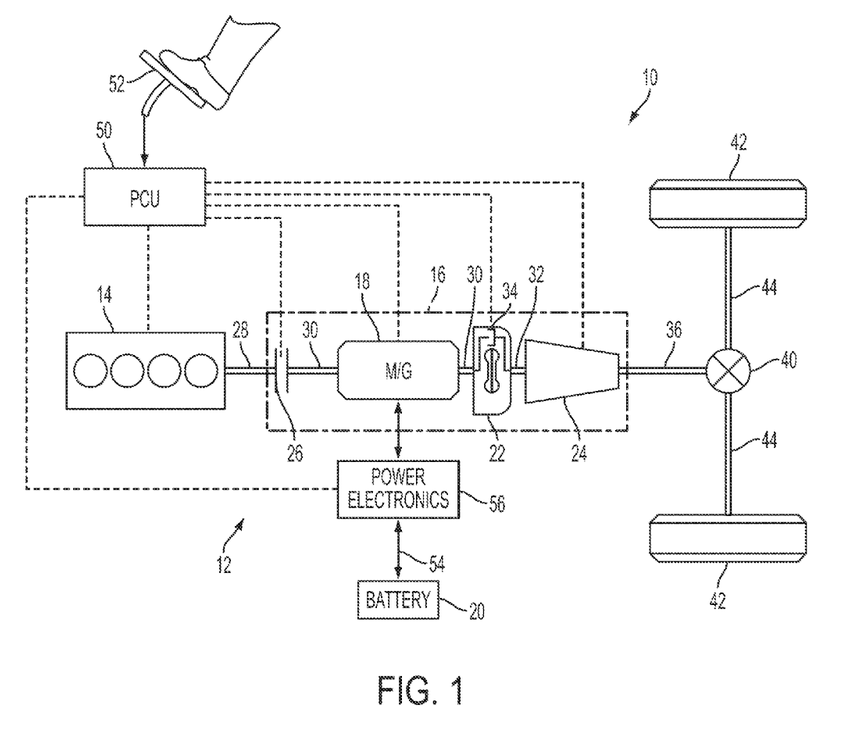
FIG. 1 illustrates a hybrid vehicle according to the present disclosure in schematic form.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or fin mare chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

One advantage of hybrid configurations, such as the exemplary vehicle illustrated in FIG. 1, is that torque provided by a motor/generator may be applied to a crankshaft to crank an engine during an engine start event. In known vehicles, a motor/generator may provide a generally constant cranking torque to an engine until the engine achieves a threshold speed.

However, during an engine start event the amount of cranking torque required to turn the engine varies. When rotation begins from a dead stop, the torque required to turn the crankshaft through the first vacuum-producing stroke (i.e. a power stroke of the cycle) combined with the torque for the subsequent compression producing stroke may substantially exceed the torque required to turn the engine through the remaining portion of the engine start event. The torque required for an engine start may thus be divided into two separate torque requirements, a "first compression torque" required to turn the engine through a first compression event and a "cranking torque" required to continue cranking the engine thereafter.

Figure 2:
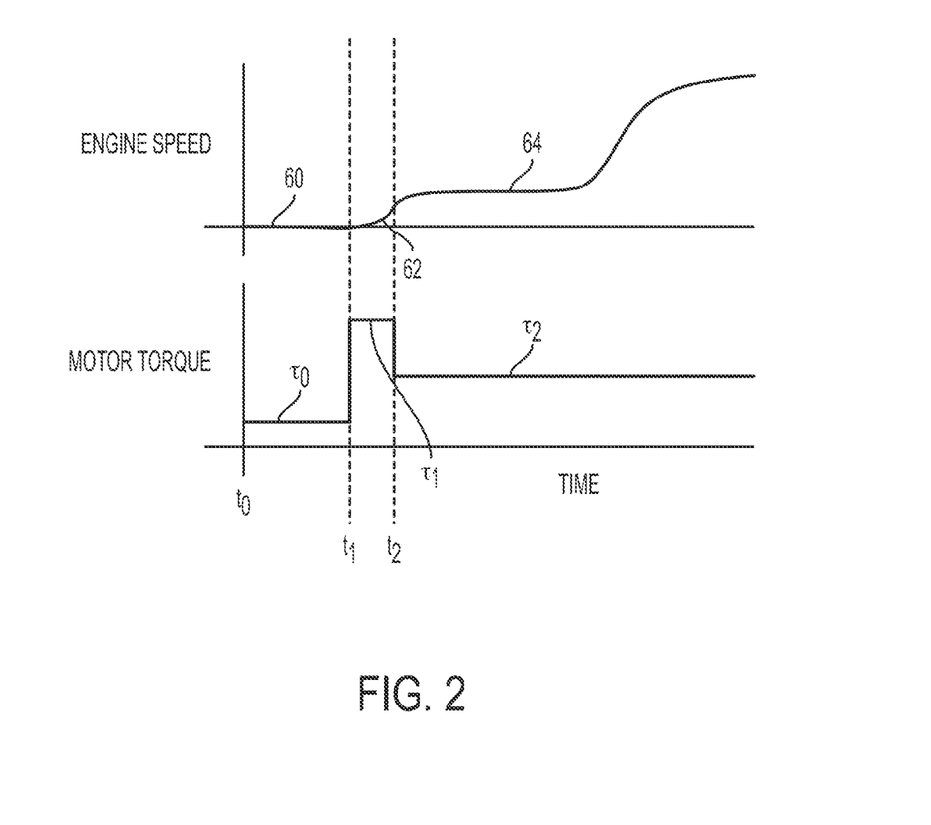
FIG. 2 illustrates engine speed and motor torque during an engine start event.

Referring to FIG. 2, an engine start event is illustrated. At time $t_0$ the engine speed is turned off, as illustrated at numeral 60, and the motor is providing a motor torque $\tau_{m,0}$. In this exemplary start event $\tau_{m,0}$ is non-zero, i.e. the motor is providing torque to vehicle traction wheels at time $t_0$ to operate the vehicle in an electric-only mode. It should be noted, of course, that this method may be implemented when $\tau_{m,0}$ is zero as well.

At time $t_1$ an engine start request is issued. In response to the engine start request, the motor torque at time $t_1$ is increased to $\tau_{m,1}$, where $\tau_{m,1}$ is at least sufficient to satisfy $\tau_{m,0}$ and a first compression torque $\tau_{m,FC}$, where $\tau_{m,FC}$ is the required motor torque to crank the engine through a first compression event. Additionally, the pressure in the disconnect clutch 26 is controlled to transmit $\tau_{m,FC}$ to the engine. It should be noted that in some circumstances the disconnect clutch may not be able to transmit a torque magnitude equal to $\tau_{m,FC}$ based on the current clutch pressure. In such a scenario, the motor torque may be reduced according to the torque the clutch is capable of transmitting. The motor torque may subsequently be increased to the target $\tau_{m,1}$ as pressure in the disconnect clutch 26 increases.

In an exemplary embodiment, $\tau_{m,FC}$ is calculated using a calibratable baseline torque and a set of multipliers or scale factors based on engine operating conditions. The multipliers may be based on crankshaft position, engine temperature, barometric pressure, an engine friction estimate, and soak time. The baseline torque may be, for example, 100 Nm. The engine friction estimate may vary according to engine temperature, engine speed, and barometric pressure for a given engine class, and may be adapted over time. Other appropriate variables may, of course, be used to calculate $\tau_{m,FC}$. The value of $\tau_{m,FC}$ is preferably intermittently recalculated, for example at one second intervals, during periods when the engine is off. In addition, the value of $\tau_{m,FC}$ may be recalculated as the engine position changes during a start event, for example at calibratable crank intervals.

It should be noted that the calculation of $\tau_{m,FC}$ may in some embodiments be modified for an engine start event that is the first engine start following a key-on event. For example, a crankshaft position reading may be unavailable when first starting the engine, and thus the calculation of $\tau_{m,FC}$ may be based in part on a "worst case" crankshaft stop position. In a six cylinder engine, the worst case position may be 120 degrees before top dead center (TDC), as at this position one cylinder is at TDC on a power stroke, necessitating increased torque as it draws a vacuum. As another example, the baseline torque may be increased for a first start, for example to 120 Nm.

Returning to FIG. 2, at time $t_1$ the engine begins to rotate due to motor torque transmitted through the disconnect clutch 26, as illustrated at numeral 62. At time $t_2$ the engine completes a first compression event. In response to the engine completing the first compression event, the motor torque is reduced to $\tau_{m,2}$, where $\tau_{m,2}$ is at least sufficient to satisfy $\tau_{m,0}$ and a cranking torque $\tau_{m,C}$, where $\tau_{m,C}$ is the required motor torque to crank the engine through the remainder of the engine start.

In an exemplary embodiment, $\tau_{m,C}$ is calculated using a calibratable baseline torque and a set of multipliers or scale factors based on engine operating conditions. The multipliers may be based on engine temperature, barometric pressure, an engine friction estimate, and soak time. The baseline torque may be, for example, 20 Nm. Other appropriate variables may, of course, be used to calculate $\tau_{m,C}$. The value of $\tau_{m,C}$ is preferably intermittently recalculated, for example at one second intervals, during periods when the engine is off. The engine continues to crank under the influence of $\tau_{m,C}$ and increase in speed until the engine start is complete, as illustrated at numeral 64. Once the engine has started, at least one controller may control the engine, disconnect clutch, and motor according to any appropriate hybrid operation logic.

It should be noted that when the vehicle operates in an electric only mode, the motor continues to provide torque to traction wheels to satisfy driver torque demands until the engine starts. Thus, although $\tau_{m,0}$ is shown as being constant in FIG. 2 for illustrative purposes, $\tau_{m,0}$ may vary during the engine start according to driver torque demands.

In a preferred embodiment, at least one software "flag" is implemented to signal that various steps of the algorithm are complete. For example, a "first compression complete" flag frst_comp_flag may be activated in response to the engine completing the first compression event. The motor torque may be reduced from $\tau_{m,1}$ to $\tau_{m,2}$ in response to the frst_comp_flag being activated. The frst_comp_flag may subsequently be reset when the engine stops, for example in response to the engine speed being zero. In addition, the flag may be set to activate upon completion of a second compression event if the engine stop position is too close to top dead center. As an additional example, a separate flag may be used to signal that the first engine start following a key-on event has occurred. Such a flag may be reset in response to a key-off event.

Figure 3:
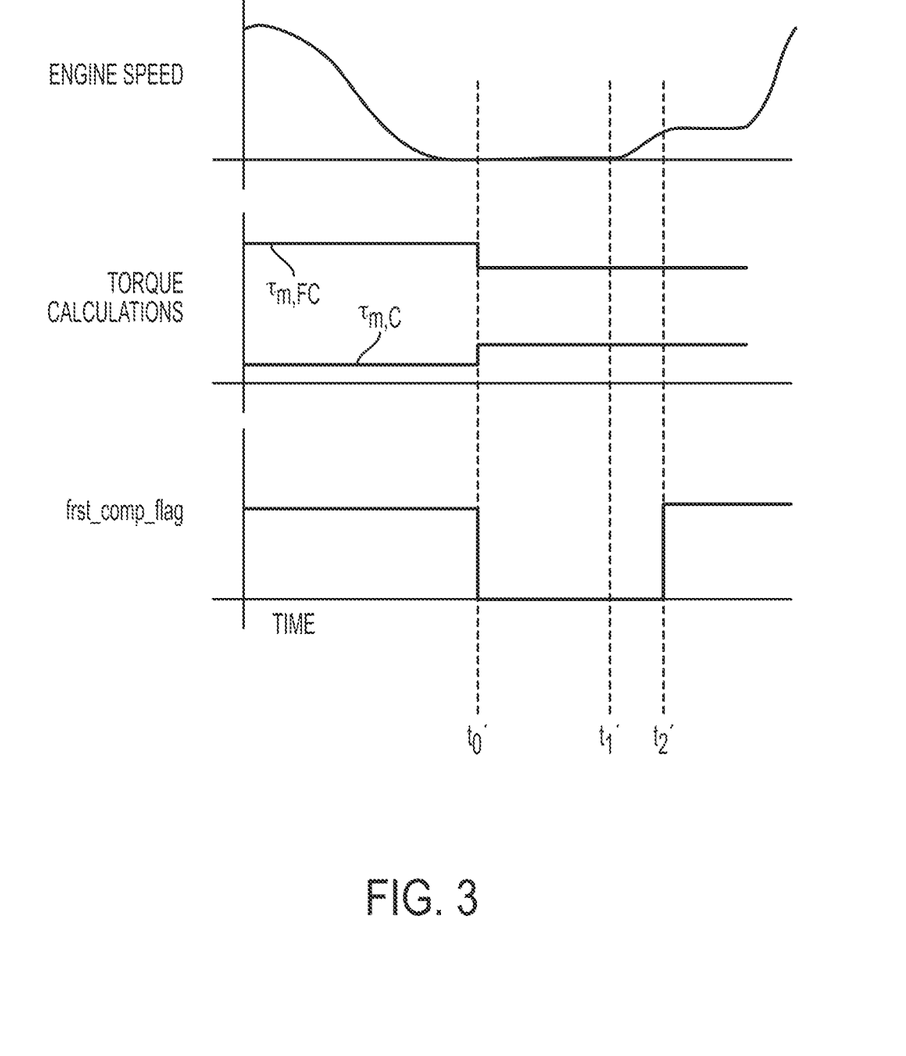
FIG. 3 illustrates a torque recalculation during an engine off event.

Referring to FIG. 3, a first compression complete flag is illustrated. In response to the engine speed reaching zero at time $t_0'$ frst_comp_flag is reset. In this exemplary embodiment, calculated values for $\tau_{m,FC}$ and $\tau_{m,C}$ are recalculated in response to frst_comp_flag being reset. These calculated values may also be intermittently recalculated while the engine is stopped. At time $t_1'$ an engine start request is received, and the engine is started generally as described above with respect to FIG. 2. At time $t_2'$ the engine completes the first compression event, and frst_comp_flag is activated. The motor torque (not illustrated) will be reduced in response to this flag being activated, as illustrated in FIG. 2.

Figure 4:
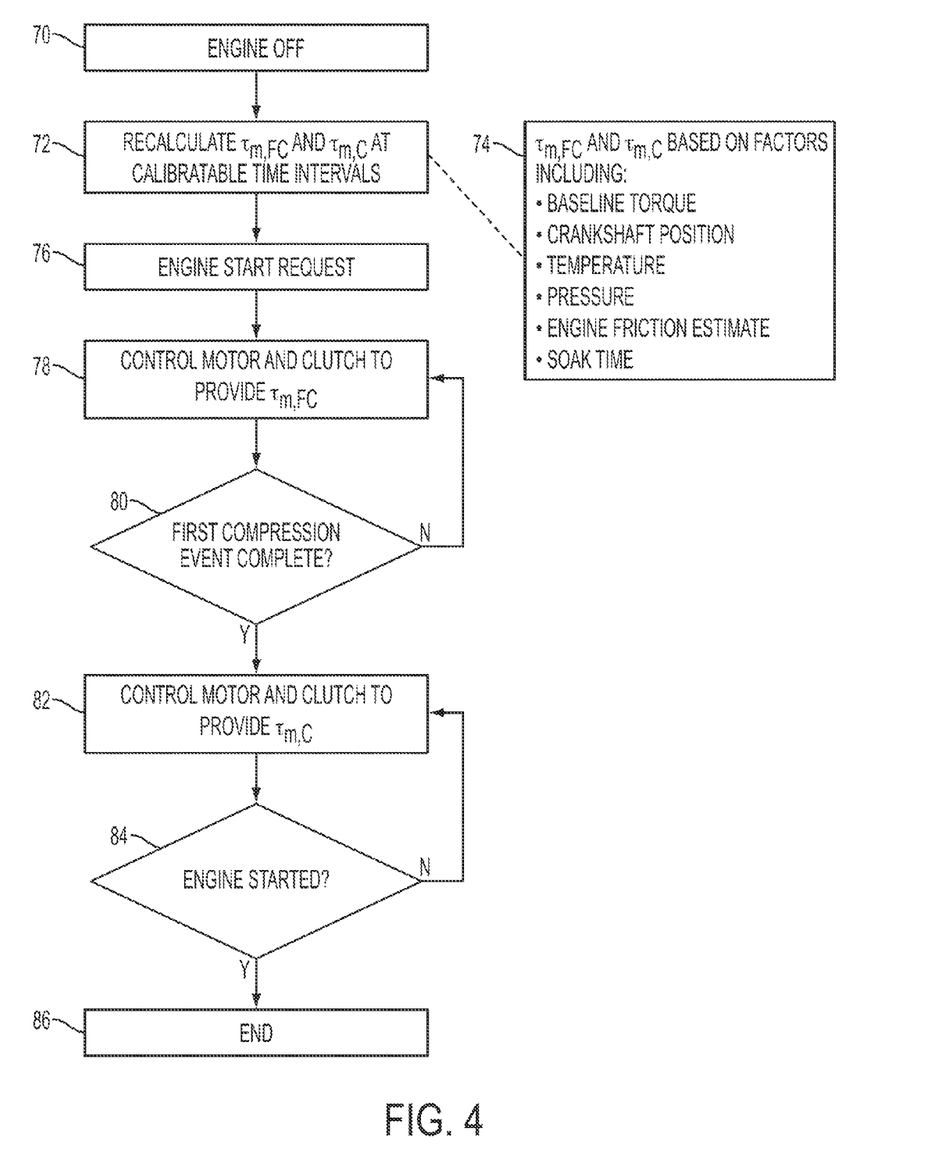
FIG. 4 illustrates a method for controlling a vehicle in flowchart form.

Referring to FIG. 4, a method for controlling a vehicle according to the present disclosure is illustrated in flowchart form. At the outset, the engine is off, as illustrated at block 70. While the engine is off, a required motor torque for a first compression event $\tau_{m,FC}$ and a required motor cranking torque $\tau_{m,C}$ are recalculated at calibratable time intervals, as illustrated at block 72. $\tau_{m,FC}$ and $\tau_{m,C}$ may be calculated based upon various engine conditions, as illustrated at block 74. These conditions may include a calibratable baseline torque, a crankshaft position, engine temperature, barometric pressure, an engine friction estimate, soak time, or other appropriate conditions. An engine start request is received, as illustrated at block 76. The motor and clutch are controlled to provide $\tau_{m,FC}$ to the engine, as illustrated at block 78. This may be an additional torque above a torque supplied to vehicle traction wheels. At block 80, a determination is made of whether a first compression event is complete. If no, the motor continues to provide $\tau_{m,FC}$. If yes, then the motor and clutch are controlled to provide $\tau_{m,C}$, as illustrated at block 82. At block 84, a determination is made of whether the engine has started. If no, the motor continues to provide $\tau_{m,C}$. If yes, then the algorithm ends, as illustrated at block 86.

Variations of the above method are of course possible. For example, a calculation for a complete torque profile for an engine start may be provided. In such an embodiment, motor torque may be varied through an engine start according to a profile calculated based on similar engine parameters as discussed above. Such an embodiment may provide a more efficient engine start, but would also be more calculation-intensive.

As can be seen from the above embodiments, the present invention provides a system and method for using a motor/generator to efficiently start an engine at lower torque levels without disturbing torque provided to vehicle traction wheels.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling a hybrid vehicle powertrain including a motor and an engine comprising:
   responsive to an engine start request, providing a first motor torque to crank the engine through a first compression event;
   recalculating the first motor torque after a calibratable crank interval; and
   providing a second motor torque, less than the first motor torque, to crank the engine through subsequent compression events.

2. The method of claim 1, wherein the engine start request is a first start request subsequent to a key-on event and the first motor torque to crank the engine through a first compression event is based on a calibratable baseline torque and at least one of temperature, pressure, an engine friction estimate, and an elapsed time with the engine off.

3. The method of claim 1, wherein the engine start request is at least a second start request subsequent to a key-on event and the first motor torque to crank the engine through a first compression event is based on a calibratable baseline torque and at least one of engine stop position, temperature, pressure, an engine friction estimate, and an elapsed time with the engine off.

4. The method of claim 1, wherein the second motor torque is based on a calibratable baseline torque and at least one of temperature, pressure, an engine friction estimate, and an elapsed time with the engine off.

5. The method of claim 1, further comprising, in response to a driver torque request, providing a motor drive torque to vehicle traction wheels, wherein providing a first motor torque comprises commanding the motor to provide the first motor torque and the motor drive torque, and providing a second motor torque comprises commanding the motor to provide the second motor torque and the motor drive torque.

6. A hybrid vehicle comprising:
   an internal combustion engine;
   a motor configured to provide torque to vehicle wheels and cranking torque to the engine; and
   at least one controller programmed to, in response to an engine start request, command the motor to provide a first motor torque to crank the engine through a first compression event from dead stop and, in response to the engine being cranked through the first compression event, command the motor to provide a second motor torque, less than the first motor torque, to crank the engine through subsequent compression events,
   wherein the controller is further programmed to intermittently recalculate the first motor torque and the second motor torque at calibratable intervals.

7. The hybrid vehicle of claim 6, wherein the engine start request is a first start request subsequent to a key-on event and the first motor torque to crank the engine through a first compression event from dead stop is based on a calibratable baseline torque and at least one of temperature, pressure, an engine friction estimate, and an elapsed time with the engine off.

8. The hybrid vehicle of claim 6, wherein the engine start request is at least a second start request subsequent to a key-on event and the first motor torque to crank the engine through a first compression event from dead stop is based on a calibratable baseline torque and at least one of engine stop position, temperature, pressure, an engine friction estimate, and an elapsed time with the engine off.

9. The hybrid vehicle of claim 6, wherein the second motor torque is based on a calibratable baseline torque and at least one of temperature, pressure, an engine friction estimate, and an elapsed time with the engine off.

10. A method for controlling a motor in a hybrid vehicle comprising:
    providing drive torque to vehicle wheels when an engine is stopped;
    at calibratable intervals, calculating a first additional torque to crank the engine through a first compression event;

in response to an engine start request, providing the first additional torque; and in response to the engine being cranked through the first compression event, providing a second additional torque less than the first additional torque.

11. The method of claim 10, wherein the first additional torque is recalculated based on at least one of a calibratable baseline torque, an engine stop position, temperature, pressure, an engine friction estimate, and an elapsed time with the engine off.

12. The method of claim 10, wherein the second additional torque is calculated based on at least one of a calibratable baseline torque, temperature, pressure, an engine friction estimate, and an elapsed time with the engine off.

13. The method of claim 12, further comprising recalculating the second additional torque at calibratable intervals.

* * * * *